United States Patent [19]
Giersing

[11] 3,841,908
[45] Oct. 15, 1974

[54] AUXILIARY SCREW CONVEYORS
[75] Inventor: Jorgen Giersing, Stege, Denmark
[73] Assignee: Aktieselskabet De Danske Sukkerfabrikker, Copenhagen, Denmark
[22] Filed: Oct. 25, 1972
[21] Appl. No.: 300,494

[30] Foreign Application Priority Data
Oct. 25, 1971  Great Britain.................. 49496/71

[52] U.S. Cl....................... 127/5, 23/270 R, 127/3, 198/213
[51] Int. Cl............................................. C13d 1/08
[58] Field of Search.................................. 127/2–8; 23/270 R

[56] References Cited
UNITED STATES PATENTS
3,142,589  7/1964  Schaffer................................ 127/3
3,355,260  11/1967  Bruniche-Olsen.................. 127/5 X
3,420,708  1/1969  Schaffer............................... 127/3 X
3,471,328  10/1969  Bruniche-Olsen..................... 127/5
3,573,982  4/1971  Silver................................... 127/7 X
3,726,715  4/1973  Mushack............................... 127/5

Primary Examiner—Morris O. Wolk
Assistant Examiner—Sidney Marantz

[57] ABSTRACT

In a lixiviating apparatus comprising an elongated inclined trough and two screw conveyors for the transportation of disintegrated material through the trough in counter-current with a lixiviating liquid, auxiliary means of transportation extending parallel to said screw conveyors and adapted to transport material which is pressed out of the two screw conveyors toward the lower end of the trough.

3 Claims, 3 Drawing Figures

AUXILIARY SCREW CONVEYORS

BACKGROUND OF THE INVENTION

This invention relates to a lixiviating apparatus comprising an inclined trough, at least two screw conveyors rotatable about parallel axes mounted in said trough for transporting disintegrated material from the lower end of the trough towards its upper end in countercurrent with lixiviating liquid, means for introducing disintegrated material into the lixiviating trough at its lower end, means for discharging lixiviated disintegrated material from the trough at its upper end, means for introducing lixiviating liquid at the upper end of the trough and means for discharging enriched lixiviated liquid from the trough at its lower end.

Apparatuses of this type have found widespread use within the sugar industry for the production of sugar juice from a sugar-containing raw material, such as disintegrated sugar beets.

Due to variations in the composition and the nature of the disintegrated sugar-containing material introduced into the trough, zones with reduced permeability for the lixiviating liquid may be created during the transportation of material through the trough in such a prior art lixiviating apparatus. The result is that the liquid level is increased on the upstream side of such zones and reduced on the downstream side. An increased liquid level at the upstream side reduces the rate of movement of the disintegrated material on the upstream side and counteracts a normalization of the disturbed conditions.

At the same time a low liquid level on the downstream side increases the rate of movement of the disintegrated material on the downstream side so that relatively increased amounts of disintegrated material are moved towards the zone in which the problems are created.

Also the increased pressure of liquid on the upstream side contributes to the compression of the disintegrated material and thus increases the problems. Thus, the problems created by the formation of zones having reduced permeability to liquids are self-intensifying.

In order to eliminate the intermittently created problems it has hitherto been necessary based on continuous human inspection of the operation of the lixiviating apparatus to effect various corrections. Thus, in order to reduce the problems and to re-establish normal operation conditions, it has been attempted to reduce the supply of lixiviating liquid or disintegrated material to the lixiviating trough in periods of disturbed operation. It has also been attempted to reduce the speed of transportation of the disintegrated material for example by reducing the speed of rotation of the screw conveyors.

These measures result in either a decreased lixiviation or a reduction of the capacity. Furthermore, such measures disturb the operation and require human action.

The object of the invention is to eliminate the effect of variations of the composition and nature of the disintegrated material without human action.

SUMMARY OF THE INVENTION

The lixiviating apparatus of the invention is characterized in that it comprises auxiliary means of transportation extending parallel to said screw conveyors and being adapted to transport in the longitudinal direction of said screw conveyors, material which is pressed out of reach of said screw conveyors.

By using such auxiliary means of transportation which preferably is a rotatable equalizing screw conveyor mounted above the two main screw conveyors, disintegrated material which is accumulated above the screw conveyors is moved away from the critical zone. In this manner the above mentioned intensification of the problems created when zones having a reduced permeability to lixiviating liquid are formed is avoided. The equalizing screw conveyor may rotate in a manner such that it transports material towards the upper end of the trough. However, it is preferably constructed in such a manner that the material is transported in the opposite direction because in that case a better extraction is obtained than in the case where the material is moved towards the upper end of the trough.

Since the equalizing screw conveyor or conveyors are moving continuously during the operation of the apparatus, the apparatus becomes self-adjusting and consequently no inspection or human action is required. By using the apparatus of the invention it has been found possible to obtain a significant increase of capacity which primarily is due to the fact that it is no longer necessary to effect reductions of the speed of rotation of the screw conveyors. Thus, by using an apparatus of the invention an increase of capacity of up to 50 percent compared to that of an apparatus without an equalizing screw conveyor has been obtained.

The term "screw conveyor" is to be understood as covering both screw conveyors having continuous and discontinuous screw blades, i.e., propeller-like transporting surfaces.

In a preferred embodiment of the lixiviating apparatus of the invention and especially in cases where the distance between the two screw conveyors is less than the sum of the maximum radii of said screw conveyors, the equalizing screw conveyor or conveyors are mounted in or above the V-shaped free area formed between the two screw conveyors in the zone above the shaft of said screw conveyors.

By mounting the equalizing screw conveyor at this place it is possible to eliminate the filling member which normally is mounted in or above said area in the prior art apparatuses.

Instead of using only one equalizing screw conveyor, two or more conveyors may be mounted in the zone above the main screw conveyors.

It is to be understood that also other types of auxiliary means of transportation than screw conveyors can be used in the apparatus of the invention.

DESCRIPTION OF THE PREFERRED EMBODIMENTS

Figure 1:
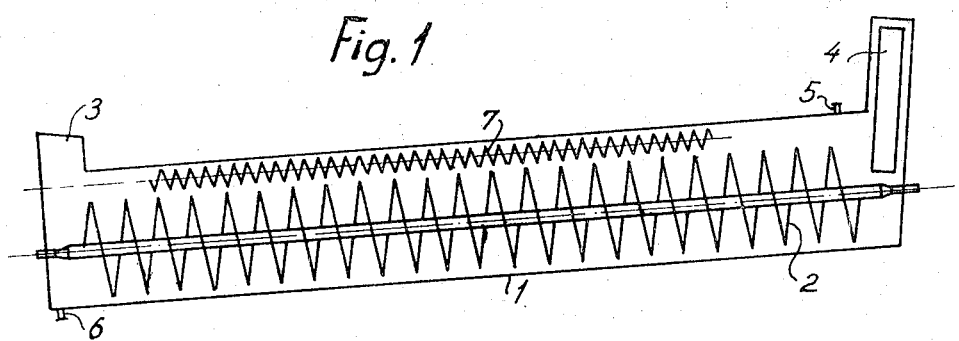
FIG. 1 schematically shows a longitudinal section through an embodiment of the apparatus of the invention, FIG. 2 schematically shows a cross-section in enlarged scale through the apparatus according to FIG. 1, and FIG. 3 schematically shows a cross-sectional view of a further embodiment of the apparatus of the invention.
Figure 2:
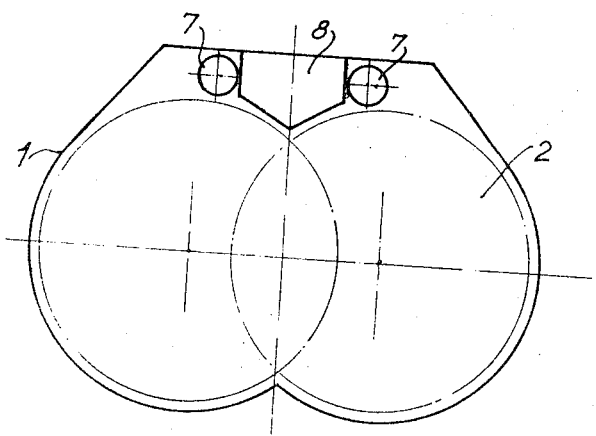

In FIGS. 1 and 2, 1 is a lixiviating trough in which there are mounted two rotatable main screw conveyors 2. The trough 1 comprises at its lower end a supply funnel 3 for introducing disintegrated material and at its upper end a discharge apparatus for lixiviated disintegrated material. Furthermore, the trough 1 comprises an inlet pipe 5 for lixiviating liquid and a discharge pipe 6 for enriched lixiviating liquid.

As will appear from FIG. 2 there is mounted a filling member 8 in the zone located between the two screw conveyors 2 and above the shafts thereof. This member serves to prevent that disintegrated material is accumulated in that zone. At each side of said filling member 8 there is provided an auxiliary screw conveyor 7 serving to equalize accumulated material in the longitudinal direction of the screw conveyors and consequently to re-establish normal operation. When using the apparatus illustrated in FIGS. 1 and 2 the screw conveyors are driven by means of driving means (not shown) in a manner such that the disintegrated material introduced through the funnel 3 is moved towards the discharge apparatus 4 in countercurrent with lixiviating liquid which is introduced through the inlet pipe 5 and which in enriched form is discharged through the outlet pipe 6. If, due to variations in the composition or the nature of the disintegrated material introduced into the trough, zones are formed having a reduced permeability to the lixiviating liquid and if, due to the formation of such zones, material is accumulated in the zone above the screw conveyors, such accumulated material will quickly be distributed in the longitudinal direction of the trough by means of the auxiliary screw conveyors 7. These screw conveyors 7 which are driven by means of driving means (not shown) are rotated in a manner such that the material which is brought into contact with the screw conveyors is moved in a direction towards the lower end of the trough.

Figure 3:
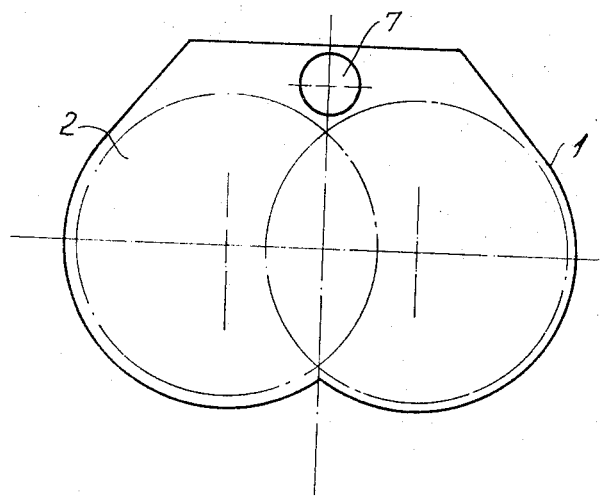

FIG. 3 shows how it is possible in a trough corresponding to that which is shown in FIG. 1 and comprising similar screw conveyors 2 to eliminate the filling member and to use instead thereof an auxiliary screw conveyor 7. The operation of the apparatus shown in FIG. 3 is similar to that of the apparatus illustrated in FIGS. 1 and 2.

I claim:

1. A lixiviating apparatus comprising an inclined trough, at least two screw conveyors rotatable about parallel axes mounted in said trough for transporting disintegrated material from the lower end of the trough towards its upper end in countercurrent with lixiviating liquid, means for introducing disintegrated material into the lixiviating trough at its lower end, means for discharging lixiviated disintegrated material from the trough at its upper end, means for introducing lixiviating liquid at the upper end of the trough and means for discharging enriched lixiviating liquid from the trough at its lower end, characterized in that is further comprises auxiliary means of transportation extending parallel to said screw conveyors and being adapted to transport in the longitudinal direction of said screw conveyors material which is pressed out of each of said screw conveyors towards the lower end of the trough.

2. A lixiviating apparatus as in claim 1, characterized in that the auxiliary means of transportation comprises at least one further screw conveyor.

3. A lixiviating apparatus as in claim 2, characterized in that the auxiliary screw conveyor is located above the axes of the main screw conveyors and in the V-shaped zone between said main screw conveyors.

* * * * *